(12) United States Patent
Kluzner et al.

(10) Patent No.: US 8,611,700 B2
(45) Date of Patent: Dec. 17, 2013

(54) DISTANCE MAP-BASED WARPING OF BINARY IMAGES

(75) Inventors: Vladimir Kluzner, Haifa (IL); Asaf Tzadok, Nesher (IL)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/231,989

(22) Filed: Sep. 14, 2011

(65) Prior Publication Data

US 2013/0064471 A1   Mar. 14, 2013

(51) Int. Cl.
*G06K 9/32* (2006.01)
(52) U.S. Cl.
USPC .......................................................... 382/300
(58) Field of Classification Search
None
See application file for complete search history.

(56) References Cited

U.S. PATENT DOCUMENTS

| | | | |
|---|---|---|---|
| 6,449,396 B1 | 9/2002 | Loce et al. | |
| 7,113,617 B2 | 9/2006 | Kimmel et al. | |
| 2002/0097912 A1* | 7/2002 | Kimmel et al. | 382/199 |
| 2011/0033131 A1 | 2/2011 | Tse et al. | |

OTHER PUBLICATIONS

Faisan, Sylvain, et al. "Topology preserving warping of binary images: Application to atlas-based skull segmentation." Medical Image Computing and Computer-Assisted Intervention—MICCAI 2008. Springer Berlin Heidelberg, 2008. 211-218.*

Parker, et al., "Grey-Level Encoding of Openings and Closings", Proceedings of Spie—The International Society for Optical Engineering, v 2060, p. 33-38, 1993. Publisher: Society of Photo—Optical Instrumentation Engineers.

Faisan et al., "Topology Preserving Warping of Binary Images: Application to Atlas-Based Skull Segmentation", In Proc. of 11th Int. Conf. on Medical Image computing and Computer Assisted Intervention, Part I, LNCS 5241, pp. 211-218, New York, NY, Sep. 2008.

P. Danielson, "Euclidean distance mapping," Computer Graphics and Image Processing, vol. 14, pp. 227-248, 1980.

Horn et al., "Schunck. Determining optical flow", Artifficial Intelligence, 17:185-203, 1981.

Kluzner et al., "Hybrid Approach to Adaptive OCR", submitted to 11th Int. Conf. on Document Analysis and Recognition, Beijing, China, Sep. 2011.

* cited by examiner

*Primary Examiner* — Stephen R Koziol
*Assistant Examiner* — Amandeep Saini
(74) *Attorney, Agent, or Firm* — Daniel Kligler

(57) ABSTRACT

A method, including calculating a first distance matrix for a first binary image and a second distance matrix for a second binary image, and calculating a first gradient matrix for the first distance matrix and a second gradient matrix for the second distance matrix. Using the calculated distance and gradient matrices, a displacement matrix is calculated that defines a change in position between elements in the first distance matrix and corresponding elements in the second distance matrix. Outlier elements are identified including elements in the displacement matrix satisfying at least one predetermined criterion, and the identified outlier are replaced with calculated interpolated values.

19 Claims, 4 Drawing Sheets

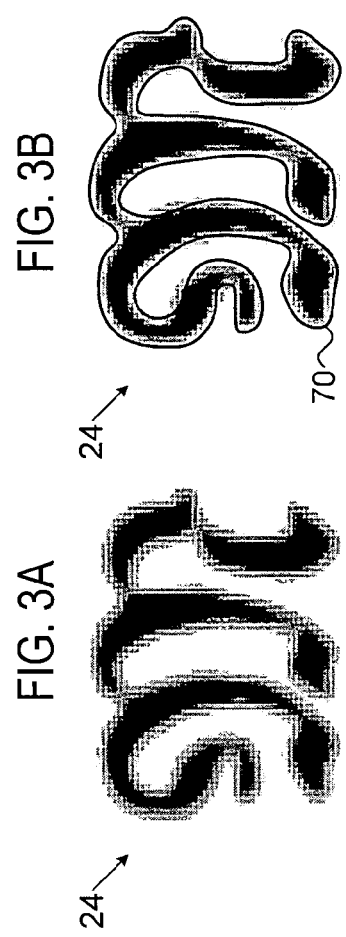
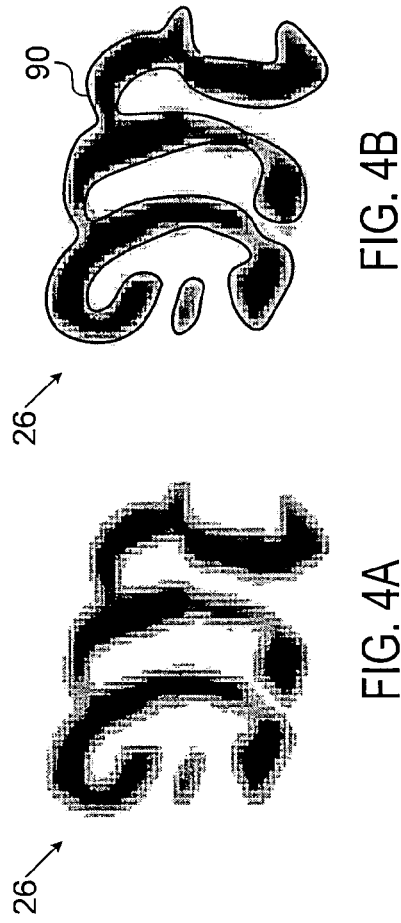
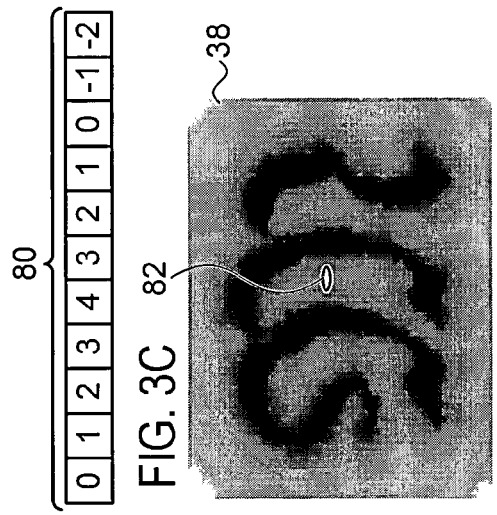
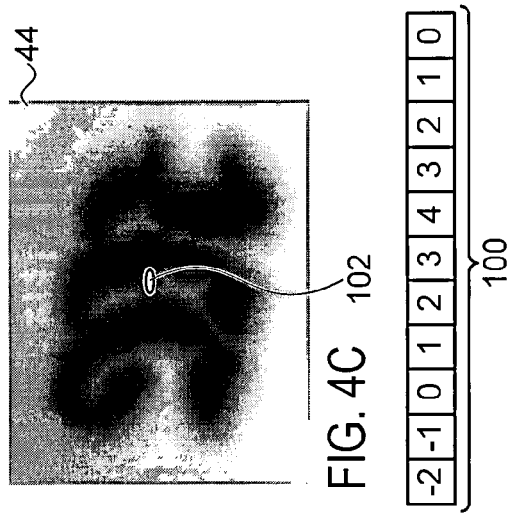

DISTANCE MAP-BASED WARPING OF BINARY IMAGES

FIELD OF THE INVENTION

This invention relates generally to digital image processing, and specifically to calculating a non-rigid registration between two binary images.

BACKGROUND OF THE INVENTION

Image warping is the process of digitally manipulating a digital image (also referred to herein as an image) so that any shapes portrayed in the image have been significantly distorted. Image warping may be used for correcting image distortion as well as for creative purposes (e.g., morphing). Additionally, warping of binary (also known as bi-level) images can be used by computer vision applications such as Optical Character Recognition (OCR), when comparing two digital images.

SUMMARY OF THE INVENTION

There is provided, in accordance with an embodiment of the present invention a method, including calculating a first distance matrix for a first binary image and a second distance matrix for a second binary image, calculating a first gradient matrix for the first distance matrix and a second gradient matrix for the second distance matrix, calculating, using the first gradient matrix and a difference between the first and the second distance matrices, a displacement matrix that defines a change in position between elements in the first distance matrix and corresponding elements in the second distance matrix, identifying outlier elements comprising elements in the displacement matrix satisfying at least one predetermined criterion, and replacing the identified outlier elements with calculated interpolated values.

There is also provided, in accordance with an embodiment of the present invention an apparatus, including a memory storing a first binary image and a second binary image, and a processor configured to calculate a first distance matrix for the first binary image and a second distance matrix for the second binary image, to calculate a first gradient matrix for the first distance matrix and a second gradient matrix for the second distance matrix, to calculate, using the first gradient matrix and a difference between the first and the second distance matrices, a displacement matrix that defines a change in position between elements in the first distance matrix and corresponding elements in the second distance matrix, to identify outlier elements comprising elements in the displacement matrix satisfying at least one predetermined criterion, and to replace the identified outlier elements with calculated interpolated values.

There is further provided, in accordance with an embodiment of the present invention a computer program product, the computer program product including a non-transitory computer readable storage medium having computer readable program code embodied therewith, the computer readable program code including computer readable program code configured to calculate a first distance matrix for a first binary image and a second distance matrix for a second binary image, computer readable program code configured to calculate a first gradient matrix for the first distance matrix and a second gradient matrix for the second distance matrix, computer readable program code configured to calculate, using the first gradient matrix and a difference between the first and the second distance matrices, a displacement matrix that defines a change in position between elements in the first distance matrix and corresponding elements in the second distance matrix, computer readable program code configured to identify outlier elements comprising elements in the displacement matrix satisfying at least one predetermined criterion, and computer readable program code configured to replace the identified outlier elements with calculated interpolated values.

BRIEF DESCRIPTION OF THE DRAWINGS

The disclosure is herein described, by way of example only, with reference to the accompanying drawings, wherein:

FIGS. 3A 3B and 3C, referred to collectively as FIG. 3, are pictorial illustrations of an example first binary image and a first distance matrix for the first binary image, in accordance with an embodiment of the present invention;

FIGS. 4A, 4B and 4C, referred to collectively as FIG. 4, are pictorial illustrations of an example second binary image and a second distance matrix for the second binary image, in accordance with an embodiment of the present invention.

DETAILED DESCRIPTION OF EMBODIMENTS

Overview

Image warping is typically performed by applying a geometric transformation to a digital image. Given a digital image M and a continuous deformation field h, a warped digital image S can be computed so that for each pixel v, $S(v)=M(h(v))$. Since $h(v)$ does not necessarily correspond with a grid point, various interpolation techniques are typically utilized in order to evaluate $M(h(v))$.

Analysis of a digital image may involve analyzing a distance map (also referred to herein as a distance matrix) and/or a gradient map (also referred to herein as a gradient matrix) of the digital image. A distance map comprises a derived representation of the digital image, where each value in the distance map indicates a distance between a corresponding pixel in the digital image and a closest boundary pixel in the digital image. For example, boundary pixels may comprise a contour (comprising contour pixels) of a digital image, in which case each value in the distance map indicates a distance between a given pixel and its closest contour pixel. Similarly, a gradient map comprises a derived representation of a digital image, so that each value in the gradient map indicates a direction (e.g., an angle) between a given pixel in the digital image and its closest boundary pixel.

Embodiments of the present invention provide methods and systems for distance map-based warping between a first and a second binary image by finding a non-rigid registration between the two binary images. A binary image comprises a digital image that has only two possible values for a given pixel. In some embodiments, contours are first identified for the first and the second binary images, and distance matrices are calculated for the two binary images, where the boundary pixels comprise the identified contours. As described in detail hereinbelow, gradient matrices may then be calculated for the distance matrices, and a displacement matrix may then be calculated in order to define a change in position between corresponding pixels in the two binary images. In some embodiments, any outlier elements in the displacement matrix are identified and replaced with interpolated values, where the outlier elements comprise undesired regions in the binary images, as described in detail hereinbelow.

Embodiments of the present invention provide an accurate level of image warping even when there are no predefined features for the two binary images, and when the two binary images are not overlapping one another. Additionally, any kind of transformation model (i.e., displacement matrix) can be used to define the change in position between the two binary images.

System Description

Figure 1:
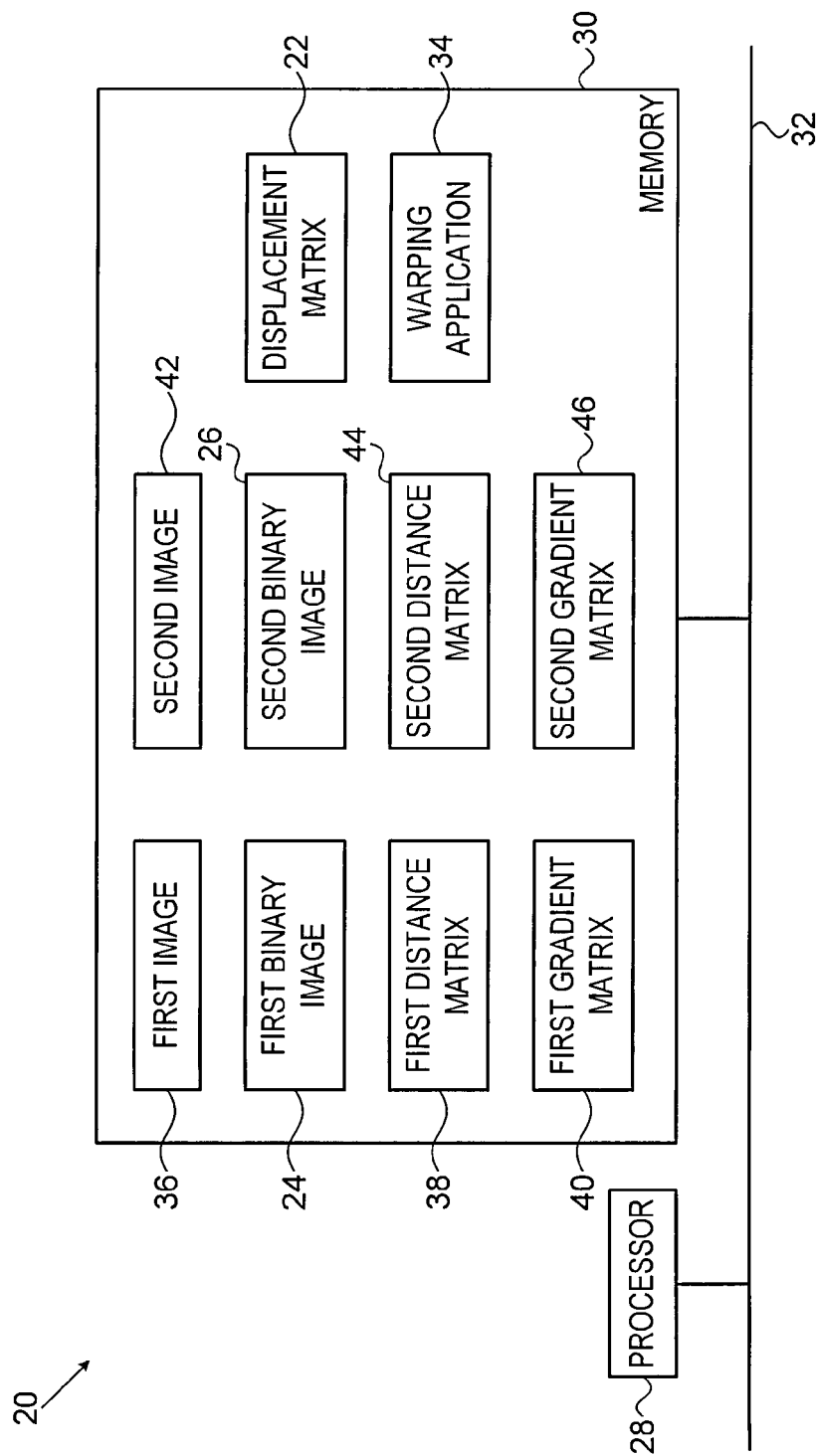
FIG. 1 is a schematic pictorial illustration of a system configured to calculate a displacement matrix that defines a non-rigid registration between a first and a second binary image, in accordance with an embodiment of the present invention.

FIG. 1 is a schematic pictorial illustration of a system 20 configured to calculate a displacement matrix 22 that defines a non-rigid registration between a first binary image 24 and a second binary image 26, in accordance with an embodiment of the present invention. System 20 comprises a processor 28 coupled to a memory 30 via a bus 32.

As described in detail hereinbelow, processor 28 executes an image warping application 34 that is configured to calculate displacement matrix 22. In operation, image warping application 34 is configured to convert a first image 36 to first binary image 24, and to calculate a first distance matrix 38 and a first gradient matrix 40 from the first binary image. Each element in the first distance matrix has a corresponding pixel in the first binary image, and each element in the first gradient matrix has a corresponding element in the first distance matrix.

Image warping application 34 is also configured to convert a second image 42 to second binary image 26, and to calculate a second distance matrix 44 and a second gradient matrix 46 from the second binary image. Image warping application 34 is also configured to calculate displacement matrix 22 using distance matrices 38 and 44, and gradient matrices 40 and 46. Each element in the second distance matrix has a corresponding pixel in the second binary image, and each element in the second gradient matrix has a corresponding element in the second distance matrix.

Additionally, each pixel in the first binary image has a corresponding pixel in the second binary image, each element in the first distance matrix has a corresponding element in the second distance matrix, and each element in the first gradient matrix has a corresponding element in the second gradient matrix.

Processor 28 typically comprises a general-purpose computer configured to carry out the functions described herein. Software operated by the processor may be downloaded to the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an, entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to, embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Calculating a Displacement Matrix

Figure 2:
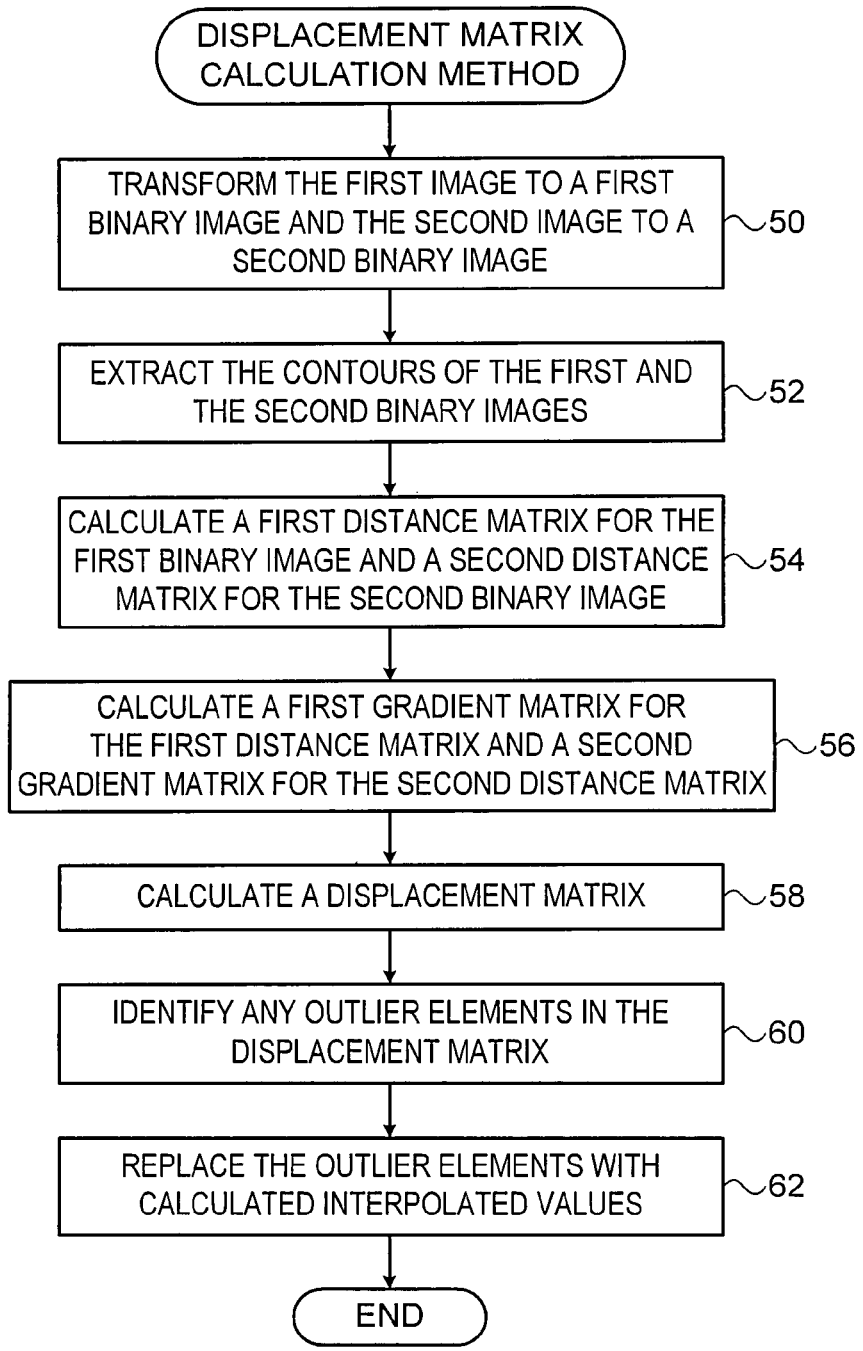
FIG. 2 is a flow diagram that schematically illustrates a method of calculating the displacement matrix, in accordance with an embodiment of the present invention.

FIG. 2 is a flow diagram that schematically illustrates a method of calculating displacement matrix 22, in accordance with an embodiment of the present invention. FIG. 3A is a pictorial representation of first binary image 24, FIG. 3B is a pictorial representation of first binary image 24 with a contour 70, and FIG. 3C is a pictorial representation of first distance matrix 38 for the first binary image, in accordance with an embodiment of the present invention.

Figure 5:
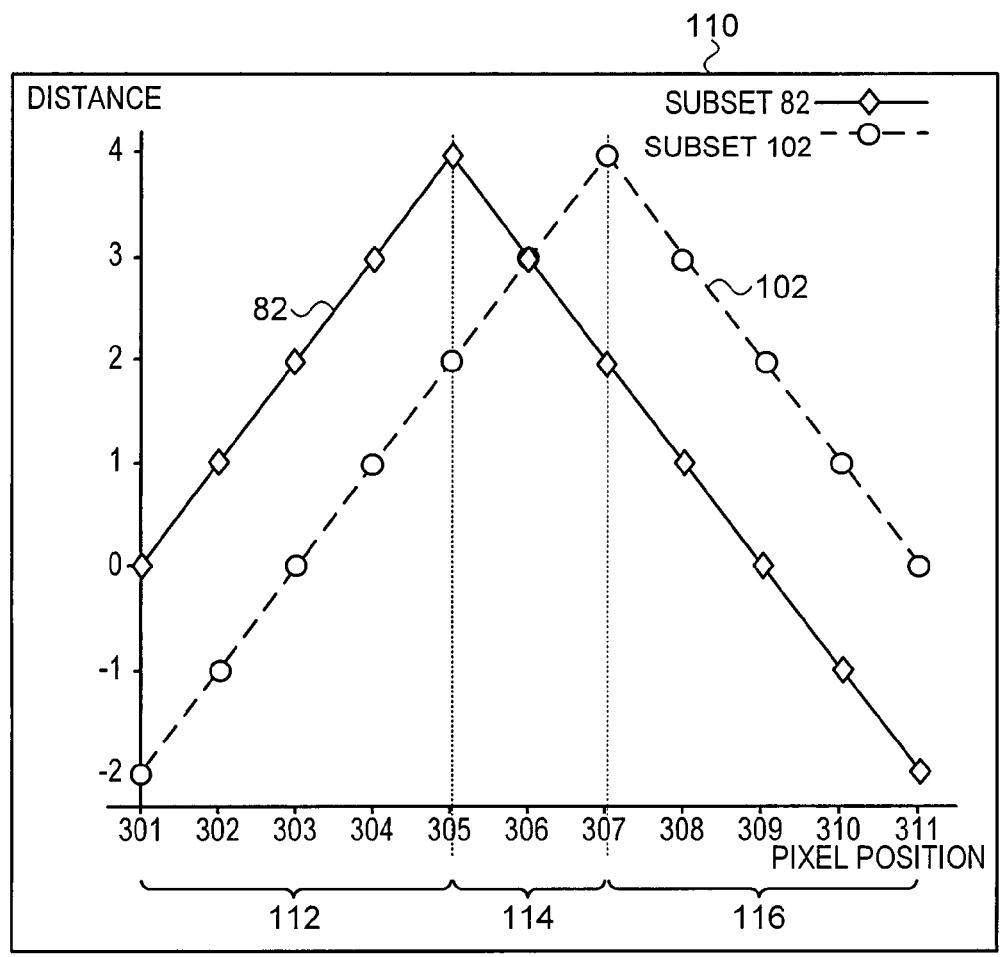
FIG. 5 is a graph showing distance values of corresponding regions in the first and the second distance matrices, in accordance with an embodiment of the present invention.

FIG. 4A is a pictorial representation of second binary image 26, FIG. 4B is a pictorial representation of second binary image 26 with a contour 90, and FIG. 4C is a pictorial representation of second distance matrix 44 for the second binary image, in accordance with an embodiment of the present invention. Images 24 and 26 are exemplary illustrations. FIG. 5 is a graph 110 plotting first distance values 80 of a subset 82 of the first distance matrix and second distance values 100 of a corresponding subset 102 of the second distance matrix, in accordance with an embodiment of the present invention.

In a transformation step 50, using digital image processing techniques known in the art, processor 28 converts first image 36 to first binary image 24, and converts second image 42 to second binary image 26. In a first identification step 52, processor 28 identifies a first contour 70 for first binary image 24, representing a first example character "M", and identifies a second contour 90 for second binary image 26 representing a second example character "M".

In a first calculation step 54, processor 28 calculates first distance matrix 38 for each pixel of first binary image 24 and second distance matrix 44 for each pixel of second binary image 26. Processor 28 can calculate the first and the second distance matrices using the formula $$T_P(q) = \inf_{p \in P} \|p - q\|_{L^2} \qquad (1)$$

where P comprises a given contour (i.e., contour 70 or contour 90), q comprises a given pixel (i.e., in the first or the second binary image), and L comprises a Euclidean distance.

Therefore, in the example shown in FIG. 3, processor 28 calculates a value for each element of first distance matrix 38 that indicates a distance between a pixel in the first binary image and a closest point to the pixel on contour 70. Likewise, in the example shown in FIG. 4, processor 28 calculates a value for each element of second distance matrix 44 that indicates a distance between a pixel in the second binary image and a closest point to the pixel on contour 90.

FIGS. 3C and 4C present the first and the second distance maps as grayscale images, where the values in the distance matrices are presented as intensities (i.e., lighter or darker shades of gray). In FIG. 3C, the intensity of a given element of first distance matrix 38 is directly proportional to a distance between a corresponding pixel in first binary image 24 and contour 70. For example, FIG. 3C shows values 80 for a one-dimensional subset 82 of first distance matrix 38, where each given value 80 comprises a distance to contour 70 that can be presented as an intensity in FIG. 3C. Likewise, in FIG. 4C, the intensity of a given element of second distance matrix 44 is directly proportional to a distance between a corresponding pixel in second binary image 26 and contour 90. Black pixels in FIG. 3C indicate pixels either on or within contour 70, and black pixels in FIG. 4C indicate pixels either on or within contour 90.

In FIG. 3C, a given value 80 that is positive (i.e. >0) indicates a distance between corresponding pixel in binary image 24 and a closest point on contour 70, where the corresponding pixel is positioned outside contour 70. A given value 80 that equals zero indicates a corresponding pixel in binary image 24 that is positioned on contour 70. A given value 80 that is negative (i.e. <0) indicates a distance between corresponding pixel in binary image 24 and a closest point on contour 70, where the corresponding pixel is positioned within contour 70.

Likewise, in FIG. 4C, a given value 100 that is positive (i.e. >0) indicates a distance between corresponding pixel in binary image 26 and a closest point on contour 90, where the corresponding pixel is positioned outside contour 90. A given value 100 that equals zero indicates a corresponding pixel in binary image 26 that is positioned on contour 90. A given value 100 that is negative (i.e. <0) indicates a distance between corresponding pixel in binary image 26 and a closest point on contour 90, where the corresponding pixel is positioned within contour 90.

In a second calculation step 56, processor 28 calculates first gradient matrix 40, also termed I1, for first binary image 24, and second gradient matrix 46, also termed I2, for second binary image 26. Each element in the first gradient matrix comprises a horizontal X-axis component and a vertical Y-axis component that when combined indicate an angle between a pixel in first binary image 24 and its closest point on contour 70. Likewise, each element in the second gradient matrix comprises a horizontal X-axis component and a vertical Y-axis component that when combined indicate an angle between a pixel in second binary image 26 and its closest point on contour 90.

In a third calculation step 58, processor 28 calculates displacement matrix 22 using first distance matrix 38, second distance matrix 44 and first gradient matrix 40. Displacement matrix 22 has an X-axis component u and a Y-axis component v that can be initially calculated as follows:

$$u = -\frac{I1_x I_t}{\sqrt[2]{I1_x^2 - I1_y^2}}, \qquad (2)$$

-continued $$v = -\frac{I1_y I_t}{\sqrt[2]{I1_x^2 - I1_y^2}} \quad (3)$$

In Equations (2) and (3), $I_t$ represents a difference between I1 and I2. For example, if for a given pixel (x,y) I1(x,y) is "3" and the corresponding value in the second distance matrix, I2(x,y) is "5", then $I_t$(x,y) is "2". For a given pixel (x,y) in the first binary image, $I1_x$ represents a partial derivative along the X-axis, and $I1_y$ represents a partial derivative along the Y-axis (i.e., $I1_x$ and $I1_y$ represent respective X-axis and Y-axis components of the first gradient matrix).

Using Equations (2) and (3) processor 28 can calculate (u(x,y), v(x,y)) for every pixel (x,y) in first binary image 36, thereby generating displacement matrix 22. The processor may also calculate a polynomial transformation between source points $(x_i, y_i)$ and destination points $(x_i+u(x_i, y_i), y_i+v(x_i, y_i))$ using displacement matrix 22.

As described supra, each element in displacement matrix 22 typically comprises a first value indicating a displacement along the X-axis (i.e., "u"), and a second value indicating a displacement along the Y-axis (i.e, "v"). For example, in FIGS. 3C and 4C, the fourth value 80 in subset 82 is "3", and the fourth value 100 in subset 102 is "1". Assuming $I1_y$=0, then $I1_x$=3, and $I_t$=2. Therefore, applying Equations (2) and (3) to calculate the transformation matrix element (u, v) for the corresponding pixel in binary image 24 results in u=2 and v=0.

In a second identification step 60, processor 28 identifies any "outlier" elements in displacement matrix 22. An outlier element comprises an element in displacement matrix 22, where a calculated angle between an element in the first gradient matrix and a corresponding element in the second gradient matrix is outside specified predetermined criteria. For example, processor 28 can set the criteria as (a) $\nabla I1^2 > 0$, (b) $\nabla I2^2 > 0$, and (c) $\nabla I1 \cdot \nabla I2 > 0$. The first two criteria eliminate any influence of regions with zero spatial gradients, and the third criterion eliminates the influence of a joint region where the spatial gradients of the first and the second distance matrices are related by a given angle. In the third criterion, $\nabla I1 \cdot \nabla I2 > 0$ indicates that an angle between an element in the first gradient matrix and a corresponding element in the second gradient matrix needs to be less than 90° to satisfy the criterion.

In some embodiments, processor 28 can specify the criteria for outlier and non-outlier elements based on a type of application currently executing on a processor. For example, for an OCR application, processor 28 can set criterion (c) to $\nabla I1 \cdot \nabla I2 > 0$, and for a facial recognition application, processor 28 can set criterion (c) to $\nabla I1 \cdot \nabla I2 > 0.3$, thereby indicating that an angle between an element in the first gradient matrix and a corresponding element in the second gradient matrix needs to be less than 60° to satisfy the criterion. Alternatively processor 28 can set any number of criteria based on any combination of the first and the second gradient maps and the first and the second distance maps.

Graph 110 in FIG. 5 plots distance (i.e., intensity) vs. X-axis locations (i.e., in the first and the second distance maps) for values 80 of subset 82 and values 100 of subset 102. As indicated by values 80 and 100, subset 102 comprises subset 82 shifted two pixels to the right. Graph 110 presents subsets 82 and 102 as aligned (i.e., have similar slopes) in regions 112 and 116, and as not aligned in region 114. In embodiments of the present invention, values 102 and 104 within region 114 reference the outlier elements described supra.

Finally, in a replacement step 62, processor 28 calculates interpolated values for any identified outlier elements of the displacement matrix, and replaces the identified outlier elements with the calculated interpolated values. To calculate the interpolated values, Processor 28 can use calculations that are known in the art, including a model-based interpolation, a free-form interpolation and a polynomial interpolation. In some embodiments, processor 28 can calculate the interpolated values based on non-outlier elements (i.e., elements meeting the specified criteria) in the displacement matrix in proximity to the outlier elements.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
calculating a first distance matrix for a first binary image and a second distance matrix for a second binary image;
calculating a first gradient matrix for the first distance matrix and a second gradient matrix for the second distance matrix;
calculating, using the first gradient matrix and a difference between the first and the second distance matrices, a displacement matrix that defines a change in position between elements in the first distance matrix and corresponding elements in the second distance matrix;
identifying outlier elements comprising elements in the displacement matrix satisfying at least one predetermined criterion;
replacing the identified outlier elements with calculated interpolated values and
wherein the predetermined criterion comprises an angle between a corresponding first gradient matrix element and a corresponding second gradient matrix element exceeding a specified threshold.
2. The method according to claim 1, and comprising converting a first image to the first binary image, and converting a second image to the second binary image prior to calculating the first and the second distance matrices.

3. The method according to claim 1 and comprising calculating a first contour for the first binary image, and calculating a second contour for the second binary image prior to calculating the first and the second distance matrices.

4. The method according to claim 3, wherein each element in the first distance matrix has a corresponding pixel in the first binary image, and indicates a distance between the corresponding pixel and a closest point on the first contour.

5. The method according to claim 4, wherein each element in the first gradient matrix has a corresponding element in the first distance matrix, and indicates an angle towards the closest point on the first contour.

6. The method according to claim 3, wherein each element in the second distance matrix has a corresponding pixel in the second binary image, and indicates a distance between the corresponding pixel and a closest point on the second contour.

7. The method according to claim 6, wherein each element in the second gradient matrix has a corresponding element in the second distance matrix, and indicates an angle towards the closest point on the second contour.

8. The method according to claim 1, wherein the interpolated values are calculated using calculations selected from a list consisting of a model-based interpolation, a free-form interpolation and a polynomial interpolation.

9. The method according to claim 1, wherein the interpolated values are calculated based on non-outlier elements in the displacement matrix in proximity to the outlier elements.

10. The apparatus according to claim 1, wherein each element in the second distance matrix has a corresponding pixel in the second binary image, and indicates a distance between the corresponding pixel and a closest point on the second contour.

11. The apparatus according to claim 10, wherein each element in the second gradient matrix has a corresponding element in the second distance matrix, and indicates an angle towards the closest point on the second contour.

12. The method according to claim 1, wherein the processor is configured to calculate the interpolated values based on non-outlier elements in the displacement matrix in proximity to the outlier elements.

13. An apparatus, comprising:
  a memory storing a first binary image and a second binary image; and
  a processor configured to calculate a first distance matrix for the first binary image and a second distance matrix for the second binary image, to calculate a first gradient matrix for the first distance matrix and a second gradient matrix for the second distance matrix, to calculate, using the first gradient matrix and a difference between the first and the second distance matrices, a displacement matrix that defines a change in position between elements in the first distance matrix and corresponding elements in the second distance matrix, to identify outlier elements comprising elements in the displacement matrix satisfying at least one predetermined criterion, and to replace the identified outlier elements with calculated interpolated values, wherein the predetermined criterion comprises an angle between a corresponding first gradient matrix element and a corresponding second gradient matrix element exceeding a specified threshold.

14. The apparatus according to claim 13, wherein the processor is configured to convert a first image to the first binary image, and to convert a second image to the second binary image prior to calculating the first and the second distance matrices.

15. The apparatus according to claim 13, wherein the processor is configured to calculate a first contour for the first binary image, and to calculate a second contour for the second binary image prior to calculating the first and the second distance matrices.

16. The apparatus according to claim 15, wherein each element in the first distance matrix has a corresponding pixel in the first binary image, and indicates a distance between the corresponding pixel and a closest point on the first contour.

17. The apparatus according to claim 16, wherein each element in the first gradient matrix has a corresponding element in the first distance matrix, and indicates an angle towards the closest point on the first contour.

18. The apparatus according to claim 13, wherein the processor is configured to calculate the interpolated values by using calculations selected from a list consisting of a model-based interpolation, a free-form interpolation and a polynomial interpolation.

19. A computer program product, the computer program product comprising:
  a non-transitory computer readable storage medium having computer readable program code embodied therewith, the computer readable program code comprising:
  computer readable program code configured to calculate a first distance matrix for a first binary image and a second distance matrix for a second binary image;
  computer readable program code configured to calculate a first gradient matrix for the first distance matrix and a second gradient matrix for the second distance matrix;
  computer readable program code configured to calculate, using the first gradient matrix and a difference between the first and the second distance matrices, a displacement matrix that defines a change in position between elements in the first distance matrix and corresponding elements in the second distance matrix;
  computer readable program code configured to identify outlier elements comprising elements in the displacement matrix satisfying at least one predetermined criterion; and
  computer readable program code configured to replace the identified outlier elements with calculated interpolated values and
  wherein the predetermined criterion comprises an angle between a corresponding first gradient matrix element and a corresponding second gradient matrix element exceeding a specified threshold.

* * * * *